US 8,145,472 B2

(12) United States Patent
Shore et al.

(10) Patent No.: US 8,145,472 B2
(45) Date of Patent: Mar. 27, 2012

(54) LANGUAGE TRANSLATION USING A HYBRID NETWORK OF HUMAN AND MACHINE TRANSLATORS

(76) Inventors: John Shore, Washington, DC (US); Ed Bice, Woodacre, CA (US)

( * ) Notice: Subject to any disclaimer, the term of this patent is extended or adjusted under 35 U.S.C. 154(b) by 1017 days.

(21) Appl. No.: 11/638,637

(22) Filed: Dec. 12, 2006

(65) Prior Publication Data

US 2007/0294076 A1 Dec. 20, 2007

Related U.S. Application Data

(60) Provisional application No. 60/749,530, filed on Dec. 12, 2005.

(51) Int. Cl.
*G06F 17/28* (2006.01)
(52) U.S. Cl. .......... 704/2; 704/4; 704/5; 704/8; 715/751
(58) Field of Classification Search .................. 704/1–9; 707/608; 715/751
See application file for complete search history.

(56) References Cited

U.S. PATENT DOCUMENTS

| | | | | |
|---|---|---|---|---|
| 5,903,858 A * | 5/1999 | Saraki | | 704/4 |
| 6,338,033 B1 * | 1/2002 | Bourbonnais et al. | | 704/3 |
| 6,952,665 B1 * | 10/2005 | Shimomura et al. | | 704/2 |
| 6,980,953 B1 * | 12/2005 | Kanevsky et al. | | 704/235 |
| 6,993,473 B2 * | 1/2006 | Cartus | | 704/2 |
| 7,110,938 B1 * | 9/2006 | Cheng et al. | | 704/5 |
| 7,209,875 B2 * | 4/2007 | Quirk et al. | | 704/2 |
| 7,283,950 B2 * | 10/2007 | Pournasseh et al. | | 704/8 |
| 7,308,399 B2 * | 12/2007 | Fallen-Bailey et al. | | 704/8 |
| 7,319,949 B2 * | 1/2008 | Pinkham | | 704/3 |
| 7,346,487 B2 * | 3/2008 | Li | | 704/2 |
| 7,698,126 B2 * | 4/2010 | Kohlmeier et al. | | 704/8 |
| 7,792,676 B2 * | 9/2010 | Klinefelter et al. | | 704/271 |
| 2002/0016712 A1 * | 2/2002 | Geurts et al. | | 704/275 |
| 2002/0111787 A1 * | 8/2002 | Knyphausen et al. | | 704/2 |
| 2002/0169592 A1 * | 11/2002 | Aityan | | 704/2 |
| 2003/0009320 A1 | 1/2003 | Furuta | | |
| 2003/0110023 A1 * | 6/2003 | Bangalore et al. | | 704/5 |
| 2003/0208543 A1 | 11/2003 | Enete et al. | | |
| 2004/0102957 A1 * | 5/2004 | Levin | | 704/3 |
| 2004/0225577 A1 | 11/2004 | Robinson | | |

(Continued)

OTHER PUBLICATIONS

Zens et al. "Improvements in Phrase-Based Statistical Machine Translation" 2004.*

(Continued)

*Primary Examiner* — Richemond Dorvil
*Assistant Examiner* — Greg Borsetti
(74) *Attorney, Agent, or Firm* — Buchanan Ingersoll & Rooney, PC (57) ABSTRACT

A Hybrid Distributed Network Language Translation (HDNLT) system having a distributed network of human and machine translators that communicate electronically and provide for the translation of material in source language. Individual translators receive a reputation that reflects their translation competency, reliability and accuracy. An individual translator's reputation is adjusted dynamically with feedback from other translators and/or comparison of their translation results to translations from those with known high reputation and to the final translation results. Additionally, translations are produced statistically, first by breaking input source text into fragments, sending each fragment redundantly to a number of translators with varying levels of reputation. Then, the results of these translations are assembled taking into account (giving weight to) the translator reputation of each translator, the statistical properties of the translation results, the statistical correlation of preferred results to target language fragments, the properties of the particular language and other relevant factors.

30 Claims, 5 Drawing Sheets

U.S. PATENT DOCUMENTS

| | | | |
|---|---|---|---|
| 2004/0260532 A1* | 12/2004 | Richardson et al. ............... 704/2 |
| 2005/0044238 A1* | 2/2005 | Jacob et al. ................... 709/227 |
| 2005/0062751 A1 | 3/2005 | Cazaboa et al. |
| 2005/0075858 A1* | 4/2005 | Pournasseh et al. ............. 704/2 |
| 2005/0240467 A1 | 10/2005 | Eckart et al. |
| 2006/0106675 A1* | 5/2006 | Cohen et al. .................... 705/26 |
| 2006/0116865 A1* | 6/2006 | Cheng et al. ...................... 704/2 |
| 2006/0206871 A1* | 9/2006 | Kohlmeier et al. ........... 717/132 |
| 2007/0073532 A1* | 3/2007 | Brockett et al. .................. 704/9 |

OTHER PUBLICATIONS

Bey et al. "BEYTrans: A Free Online Collaborative Wiki-Based CAT Environment Designed for Online Translation Communities" 2007.*

Boitet et al. "Main research issues in building web services for mutualized, non-commercial translation" Dec. 12-16, 2005.*

Saha. "A Novel 3-Tier XML Schematic Approach for Web Page Translation" 2005.*

Bey et al. "A Framework for Data Management for the Online Volunteer Translators' Aid System QRLex" Dec. 1, 2005.*

H. Holzapfel, "Towards Development of Multilingual Spoken Dialogue Systems," in Proc. of the 2nd Language and Technology Conference (L&T'05), Poznan, 2005.*

Bey. "Toward a Collaborative Wiki-Based Translation Tools for Volunteer Translators 'Transbey'" 2006.*

Shimohata et al. "Collaborative Translation Environment on the Web" 2001.*

Coch et al. "Interactive Multilingual Generation" 2004.*

Inaba et al. "Multilingual Communication Support Using the Language Grid" Aug. 2007.*

Désilets et al. "Translation the Wiki Way" 2006.*

Jones et al "Wikifying your Interface: Facilitating Community-Based Interface Translation" 2006.*

Bowker et al. "Bilingual concordancers and translation memories: A comparative evaluation" 2004.*

Chris Taylor. "It's a Wiki, Wiki World", May 29, 2005.*

Perugini e tal. "Enhancing Usability in CITIDEL: Multimodal, Multilingual, and Interactive Visualization Interfaces" JCDL'04, Jun. 7-11, 2004.*

International Search Report dated Mar. 20, 2008 issued in International Application No. PCT/US2006/47508.

International Preliminary Report of Patentability dated Jun. 18, 2008 issued in International Application No. PCT/US2006/47508.

Written Opinion dated Sep. 1, 2007 issued in International Application No. PCT/US2006/47508.

* cited by examiner

LANGUAGE TRANSLATION USING A HYBRID NETWORK OF HUMAN AND MACHINE TRANSLATORS

CROSS REFERENCE TO RELATED APPLICATIONS

This application claims priority to U.S. Provisional Patent Application Ser. No. 60/749,530 filed on Dec. 12, 2005, the contents, which are incorporated herein its entirety.

BACKGROUND

Internet-based information gathering and exchange for any scientific, commercial, political or social purpose, often requires fast and easy translation of content in order to make the universe of knowledge and ideas useful on a global scale. Computer programs that translate automatically from one language to another ("machine translation programs") can in principle meet this need, and such programs have been developed and are in continued development for a variety of languages. For formal (as opposed to informal, idiomatic, colloquial) content in well-studied languages (e.g., English, French, Spanish, German, and others), such machine translation programs work reasonably well.

However, for more-difficult or less-studied languages (e.g., Arabic), existing machine translation programs do not work well, even for formal communications (e.g., Modern Standard Arabic), and they are particularly weak in the case of informal, colloquial, idiomatic communications.

Human translators can in principle provide accurate translations for difficult languages and informal communications, but Internet applications require constant availability and quick response, which cannot be assured in the case of existing methods that use human translators.

SUMMARY

In accordance with one embodiment, a language translation system comprises: a request distribution system configured to receive requests to translate source speech or text from a source language to a target language, and wherein the request distribution system breaks the source speech or text into a plurality of redundant and overlapping or non-overlapping source speech or text fragments and incorporates the fragments into a plurality of translation requests; a translation network comprised of one or more human or machine translators, wherein the one or more human or machine translators generate translation responses containing one or more suggested translations of the source speech or text fragments into the target language, and wherein each of the one or more translators has a translator reputation that describes an expected quality of translations provided by each of the one or more translators; and a response assembly system configured to collect the translation responses and assemble the suggested translations into an overall source speech or text translation based on the translator reputations of each translator, on statistical properties of the suggested translations, on statistical properties of the source and target languages, and on the context and details of the original translation request.

In accordance with another embodiment, a language translation system comprises: a request distribution system configured to receive requests to translate a text from a first language to a second language, and wherein the request distribution system breaks the text into a translation request comprised of a plurality of redundant and overlapping text fragments; a translation network comprised of one or more translators, wherein each of the one or more translators has a translator reputation that describes an expected quality of translations provided by each of the one or more translators, and wherein the one or more translators generate a translation containing at least one suggested translation of each of the text fragments into the second language; and a response assembly system configured to collect the suggested translations and assemble the suggested translations in the second language based on the translator reputations of each translator and statistical properties of the first and second languages.

In accordance with a further embodiment, a method of translating a source language to a target language comprises: receiving a request from to translate speech or text from a source language to a target language; breaking the source text into translation requests comprised of a plurality of redundant and overlapping or non-overlapping source text fragments; forwarding the translation requests to a translation network comprised of one or more human or machine translators, wherein each of the one or more translators has a translator reputation that describes an expected quality of translations provided by each of the one or more translators; generating a translation response containing one or more suggested translations of the source speech or text fragment into the target language from at least one of the translators; collecting the translation responses from the translation network; and generating overall source speech or text translations based on the translator reputations of each translator, on the statistical properties of the suggested translation, on the statistical properties of the source and target language, and on the context and details of the original translation request.

DETAILED DESCRIPTION

The foregoing observations gave rise to a new system and method for providing fast, effective and more reliable language translation through hybrid distributed network language translation. In essence, a Hybrid Distributed Network Language Translation (HDNLT) system 10 is a distributed network of human and machine translators that communicate electronically and provide for the translation of material in source language that is challenging for existing machine translation methods, including the translation of rapidly-evolving dialogs. In this regard, the HDNLT system 10 features a number of beneficial characteristics.

For instance, the HDNLT system 10 provides a way for marshalling the resources of a large number of intermittently available, mixed competency translators in order to provide high-quality translations. Moreover, whether machine or human, translators are treated uniformly by means of abstract interfaces for translation requests and translation responses.

With this system in place, individual translators receive a reputation that reflects their translation competency, reliability and accuracy. An individual translator's reputation is adjusted dynamically with feedback from other translators and/or comparison of their translation results to translations from those with known high reputation and to the final translation results. This 'dynamic' component of translation reputation adjustment means that as the system improves over time (which may influence both the strength and the accuracy of the system's arrived at rating of a given piece of input) this system learning continues to have a 'dynamic' influence on the input author, or translator's, reputation. It can be appreciated that the user reputation is also 'dynamic' in the sense that various pieces of metadata including translator's geographic location (relative to the location of the user or entity responsible or affiliated with the source content), nationality (per the above parenthetical notation), areas of expertise, etc. can be treated as components of the reputation algorithm.

Additionally, translations are produced by breaking input source text into fragments, sending each fragment as a translation request to a translator with redundant requests being sent to a number of translators with varying levels of reputation. Then, the results of these translations are assembled taking into account (giving weight to) the reputation of each translator, the statistical properties of the translation results, the linguistic and other properties of the particular source and target languages, and other relevant factors.

In order to obtain high-quality translations, the HDNLT system 10 can facilitate one translator using the results from another translator or translation source in the form of translation suggestions (i.e., alternate translations) for the particular text fragment. When a translator selects a given fragment the system will incrementally adjust the system confidence in the selected result. This 'translation confidence' will be adjusted with regard for our translator's reputation, our translator's location, the translation domain (e.g., newswire, legal, health, travel), and other factors. The data gathered from such use will provide interesting opportunities for distributed human evaluations of competing MT engines. A "push back" mechanism provides further means for improving resulting translations.

By making previous translation pairs (sources and results) available in a convenient way, the HDNLT system 10 provides a feedback loop that both human and machine translators can use to improve their performance.

Figure 1:
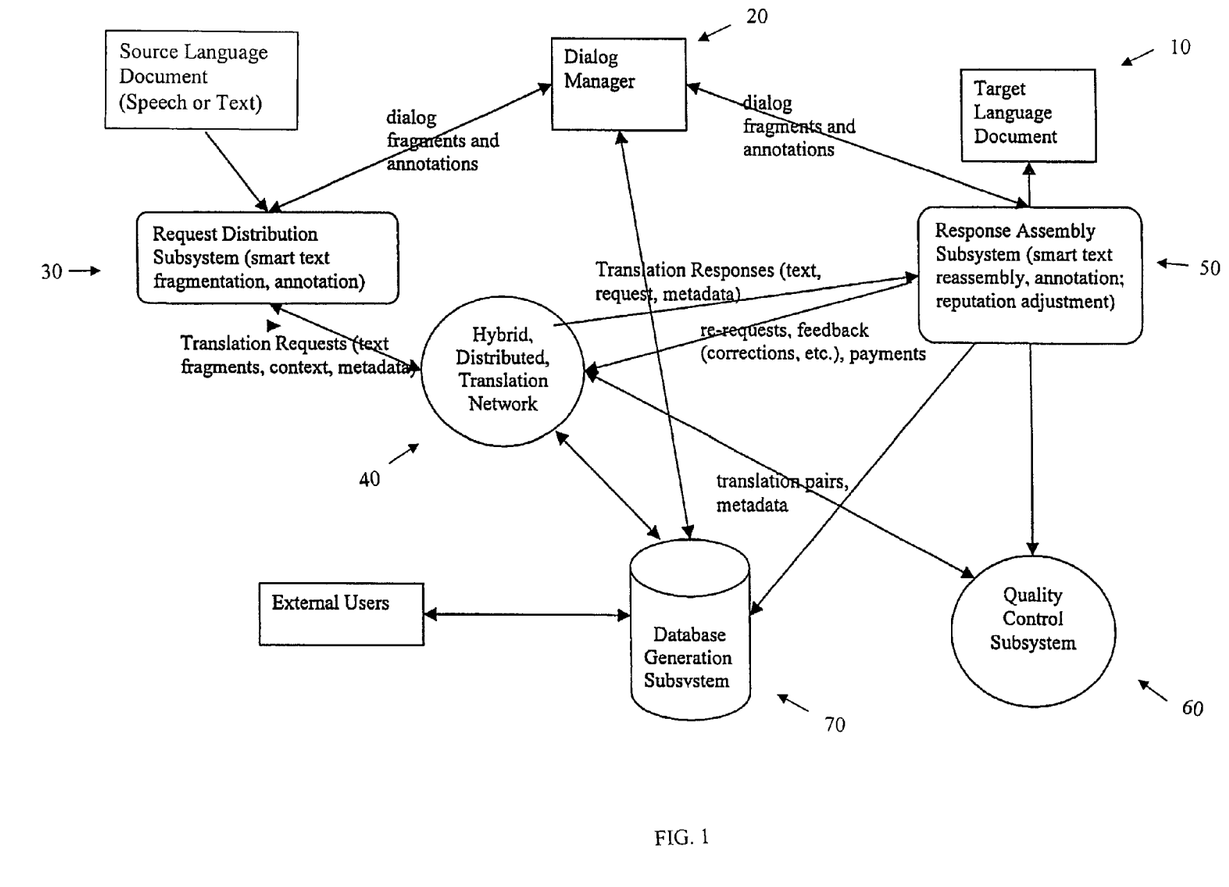
FIG. 1 shows a schematic diagram of a Hybrid Distributed Network Language Translation (HDNLT) system in accordance with one embodiment.
Figure 2:
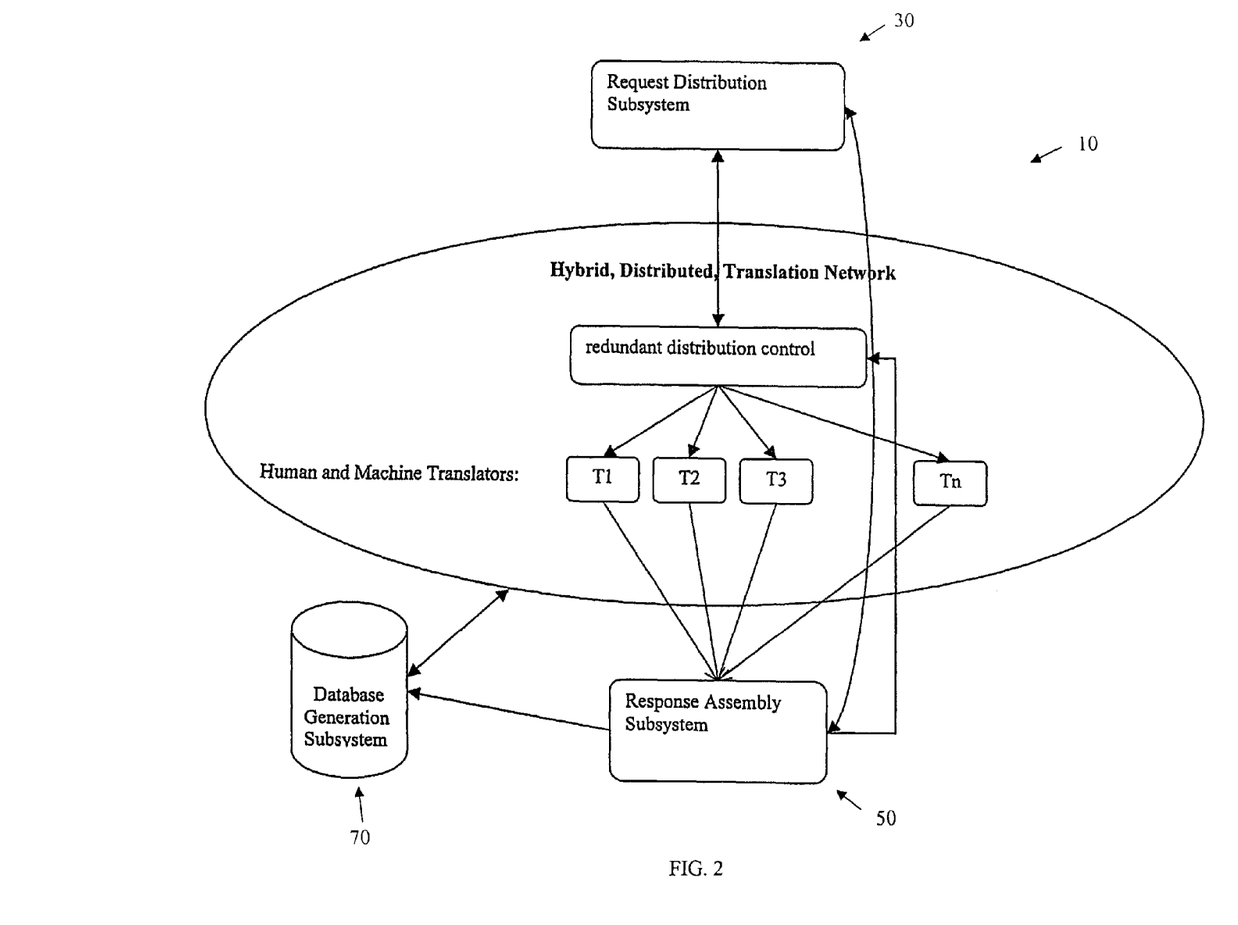
FIG. 2 shows a schematic diagram of a Hybrid Distributed Network Language Translation (HDNLT) system in accordance with another embodiment.
Figure 3:
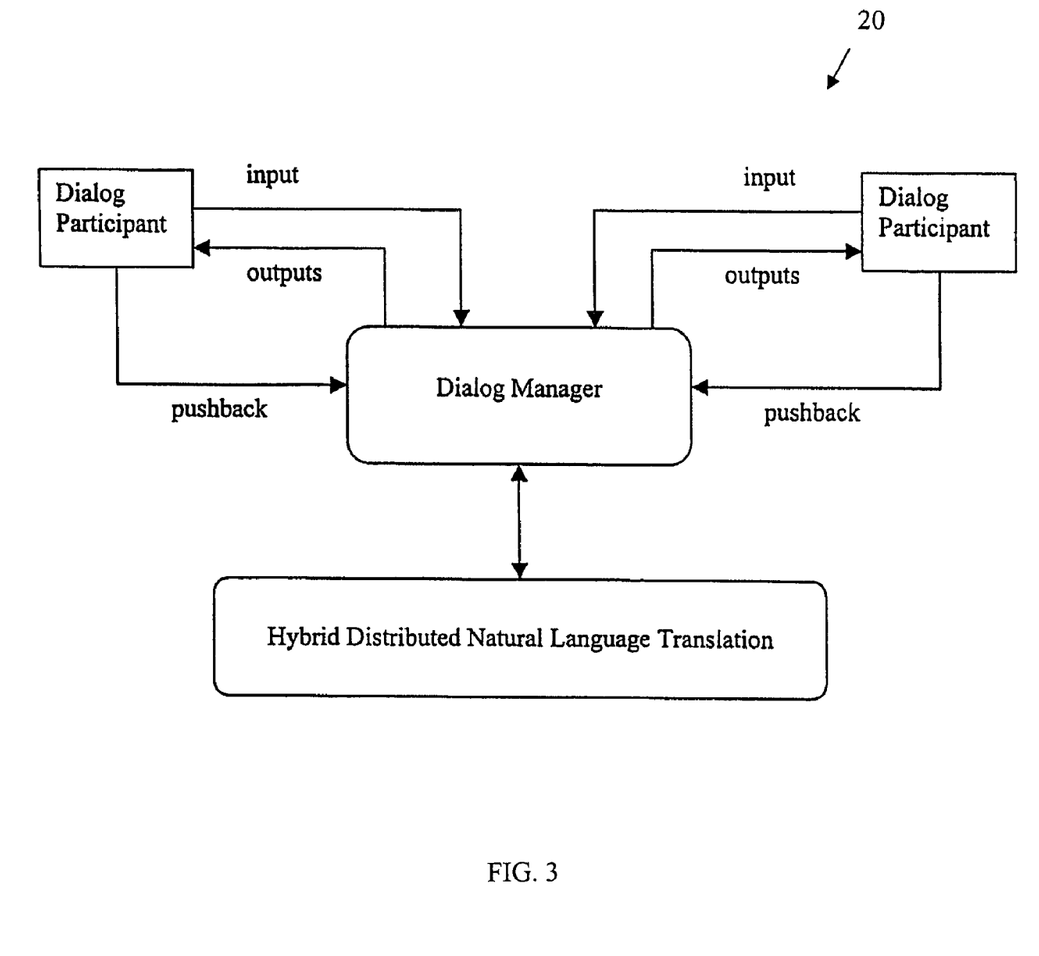
FIG. 3 shows a schematic diagram of a Hybrid Distributed Network Language Translation (HDNLT) system in accordance with a further embodiment.

The HDNLT system 10 can be implemented with various configurations in one of which it includes a Dialog Manager 20, Request Distribution Subsystem 30 (or Request Distribution System), Distributed Translation Network 40, Response Assembly Subsystem 50 (or Response Assembly System), Quality Control Subsystem 60 (or Quality Control System), and Database Generation Subsystem 70 (or Database Generation System). This particular implementation is shown in FIGS. 1-3. It can be appreciated that in accordance with one embodiment, the particular implementation of a HDNLT system 10 can be referred to as simply "the HDNLT" although it should be clear that this does not mean the one and only HDNLT system 10 configuration.

The HDNLT splits input text into sentences or other fragments (with context) and distributes them automatically to online human and machine translators who will respond with translations. Redundancy and reliability will be achieved by distributing the same fragment to multiple translators, and by re-distributing translation results to additional translators in order to improve translation accuracy. Taking into account the multiple responses, translation alternatives, reputations of the translators, desired speed and accuracy of translation output, geographic origin of the input text, information regarding probability of translation accuracy, geographic locations of translators, output of statistical parsers and other linguistic tools, the system will use sophisticated algorithms to assemble and deliver a complete translation.

The reputation of a translator is a set of values or descriptors that together describe the expected quality of translations from that translator. Such reputations may be based in part on a translator's training level and known language skills, but are modified over time based on the translator's performance as a participant in the HDNLT system 10.

Real time translation in a closed 'dialogue' setting between two people with no common language skills who have the goal of communicating via a machine translator. HDNLT is designed to facilitate system learning in the absence of skilled human translators. In such a setting, the HDNLT system 10 uses translation requests that are 'sendable' objects; which among other things means that a dialog participant will be able easily to push a text fragment back to the other dialog participants and to translators for clarification by simply clicking on that fragment and hitting a 'push back' command. HDNLT will provide the user who is 'pushing back' the fragment with the option of 'micro-blogging' or annotating the returned fragment. The recipient may also choose to have the system perform a 'circular translation'—wherein the target language fragment is itself translated and served back to the user with the flagged original fragment and the translated annotation, if any. Even in the absence of human correction, HDNLT 'learns' from any given "push back" event, making an incremental adjustment in its translation 'confidence' for that fragment. The HDNLT also will direct all 'pushed back' system fragments and their source fragment into a system wiki (or client specific wiki) which will allowed permissioned users to access source fragment, target fragment, and, for context, sentences to either side of the 'push-back,' and then provide an alternate translation or confirm the accuracy of the translation served. This "push back" translation feedback mechanism improves the ultimate accuracy of translations by allowing recipients to indicate dissatisfaction and trigger translation improvements and it provides learning opportunities for both human and machine translators. Because translation requests contain text context and are linked to translation requests based on other fragments of the same document or dialog, the system can reconsider the entire translation, if appropriate. The HDNLT system 10 includes the case of having an initial, perhaps low-quality, translation performed by an automatic machine translation program and then corrected by a human translator.

The distributed translation approach has benefits beyond the immediate provision of translation services, including:
  The gathering of valuable data for ongoing efforts to improve machine translation (MT). It can be appreciated that machine translation research and development relies heavily on training data that consists of accurate translation pairs.
  The HDNLT facilitates a scalable translation network driving scaled use for dialogs.
  Academic and commercial MT engines can be plugged into the network in order both to learn and to contribute. As the capabilities of available MT engines improve, so does the performance of the HDNLT. The system 10 uses an abstract programming interface to communicate uniformly with "translators" that may be humans or machines.

The HDNLT system 10 provides a means of comparing performance of MT engines.

The HDNLT system 10 explores the effectiveness of using micropayments to motivate a large network of part-time translators in a way that will reflect a given users contribution to an overall translation result where the contribution is equivalent to the statistical contribution that users input had on the target translation result.

Because the HDNLT distribution system can be throttled for translation delivery time and translation accuracy and because the system can incentivize high reputation, immediately available translators through variable payments reflecting the urgency and required quality of the translation results, HDNLT address the variable needs of customers and others who make use of the HDNLT translation services.

Since human translators of various reputations can participate, and since the success of any given user input stands as an assessment, the HDNLT system 10 provides an environment in which language students can both contribute and learn.

In other words, among other things, an HDNLT system 10 as illustrated in FIGS. 1-3 translates speech or text from one human language (the source language or first language) to another (the target language or second language) efficiently and more reliably. To achieve such benefits, the HDNLT system 10 includes the Dialog Manager 20, Request Distribution Subsystem 30, Distributed Translation Network 40, Response Assembly Subsystem 50, Quality Control Subsystem 60, and Database Generation Subsystem 70.

The Dialog Manager 20, Translation Request Subsystem, Response Assembly Subsystem 50, and the Database Generation Subsystem 70 include abilities to identify, predict, and make use of "dialectical suites"—collections of colloquialisms, phrasings, or communication conventions that tend to cluster. The Dialog Manager 20, Request Distribution Subsystem 30, Response Assembly Subsystem 50, Quality Control Subsystem 60, and Database Generation Subsystem 70 are implemented on one or more central servers that communicate with a network of client translators and translator requestors (client-server architecture). Moreover, in one instance, the Dialog Manager 20, Request Distribution Subsystem 30, Response Assembly Subsystem 50, Quality Control Subsystem 60, and Database Generation Subsystem 70 are implemented as peer-to-peer network without any central servers or information repositories (peer-to-peer architecture). In another instance, the Dialog Manager 20, Request Distribution Subsystem 30, Response Assembly Subsystem 50, Quality Control Subsystem 60, and Database Generation Subsystem 70 are implemented as combination of client-server and peer-to-peer network architectures.

1. Dialog Manager

A Dialog Manager 20 manages text-based interactive (threaded) conversations between dialog participants. The Dialog Manager 20 is provided either externally to but interfaced with the HDNLT system 10 or as an integral part of the HDNLT system 10. FIGS. 1 and 3 show two embodiments of the system with the Dialog Manager 20. As shown, the Dialog Manager 20 manages an ongoing dialog between dialog participants who are communicating but who require language translation services, and wherein the Dialog Manager 20 obtains the needed translations by communicating with the Request Distribution Subsystem 30 and the Response Assembly Subsystem 50. The dialog participants can "pushback" translation responses to the Dialog Manager 20 and the HDNLT, thereby rejecting the translation for reasons indicated in an accompanying metadata. A metadata, tagging, or "microblog" mechanism is used to elaborate on the pushback, whereby a dialog participant can offer advice to translators regarding, misspellings, awkward phrasing, incorrect slang, suggested slang, and other factors. Such pushback information can be used by the Distributed Translation Network 40 to learn an emergent piece of language, or even an emergent spelling of a conventional word. Additionally, both the Dialog Manager 20 and the Request Distribution Subsystem 30 obtain a new translation.

The Dialog Manager 20 presents translation output to dialog participants using any available user-interface, including the use of fonts, color, shading, grayscale, animation, and sound to display or otherwise communicate the source and translated text fragments, translation confidence levels, other metadata, alerts, etc. The Dialog Manager 20 presents translated text "grayscaled," for instance, so that fonts, lineweight, color and other text attributes indicate the statistical likelihood or probability of correctness for an indicated translated word, phrase, text fragment, or sentence. Furthermore, the Dialog Manager 20 communicates with dialog participants using speech synthesis and automatic voice recognition.

As the Response Assembly Subsystem 50 can "pushback" assembled translations to the Distributed Translation Network 40, human and machine translators "learn" from the aggregate output of the Distributed Translation Network 40 and can adjust their subsequent translations accordingly. The Dialog Manager 20 and/or the Response Assembly Subsystem 50 also can "learn" from the aggregate output of the Distributed Translation Network 40 by using statistical methods operating on the history of translation responses to adjust automatically subsequent translation responses from various translators. Such translation responses may include the translated text, the stated probabilities or the likelihoods of correctness, etc.

2. Request Distribution Subsystem

A Request Distribution Subsystem 30 receives general requests to translate text from a source natural language to a target natural language, breaks the source text into a plurality of redundant and possibly-overlapping text fragments, assembles individual translation requests by combining each such source text fragments with various metadata, and sends out each translation request to available translators in the HDNLT Network. The Request Distribution Subsystem 30 accepts requests from the Dialog Manager 20 as well as from any sources that require the translation of natural language text.

The translation requests include a text fragment for translation as well as metadata (or links, pointers, etc. by which Translators can retrieve such metadata) such as: 1) information about the translation context—e.g., preceding or succeeding words, phrases, or sentences, as well as summary information about the overall text subject, domain (e.g., newswire, legal, health, product, technical, conversational), style, tone, etc.; 2) previously suggested translations of the same text fragment received previously by the Response Assembly Subsystem 50, including their metadata; previous translations of different text from the same source; 3) a secure, anonymous identifier of the source text originator; 4) GPS (Global Positioning System) or other information about the geographic origination of the source text; 5) priority/importance of a speedy translation; 6) priority/importance of an accurate translation; 7) translation deadline; 8) "hints" about the desired translation style (informal vs. formal, in a particular dialect, colloquial, etc.); 9) an indication of whether the translation fragment is original text or itself the result of a translation; 10) track-back information locating the translation text fragment in the original text; 11) retrieval instructions (links, pointers, etc.) for previous translations of previous source text from the same source; and 12) arbitrary data in a standard XML or other format.

The Request Distribution Subsystem 30 may send the same translation request to more than one translator, wherein the choice of how many and which translators to send a given translation request is made by selection algorithms that balance the resulting total translation workload against the need to obtain a sufficiently-reliable translation within stated time constraints. The selection algorithm makes use of information about the geographic locations, availabilities, and reputations of individual translators. The Request Distribution Subsystem 30 may break the original source text for translation into a set of unique, non-overlapping text fragments that together comprise the original text, or into non-unique, possibly-overlapping text fragments in which the same words or phrases may appear in multiple, non-identical text fragments.

3. Hybrid, Distributed Translation Network

As mentioned, the HDNLT system 10 further includes a Hybrid, Distributed, Translation Network of human and/or machine translators that are electronically interconnected to each other and to the other HDNLT subsystems that communicate with them. Each translator can accept a translation request from the Request Distribution Subsystem 30 and return to the Response Assembly Subsystem 50 a translation response containing the original translation request, one or more suggested translations of the source text fragment into the target language, and optionally containing supplementary instructions, information, and various metadata.

Translators may exchange information and work cooperatively with other translators. Preferably, the translation client interface program communicates translation requests and translation responses in a uniform manner that does not depend on whether translators are humans, machines, or a combination. In other words, whether machine or human, translators are treated uniformly by means of abstract interfaces for translation requests and translation responses. The translation client interface programs may be implemented (and thereby interact with translators) on a variety of fixed or wireless network devices, including desktop computers, phones with text-message capabilities, personal digital assistants, so-called "smart phones", as well standard phones, cell phones, and other phones or telephones. The translation client interface program uses a variety of user-interface methods to maximize information exchange with human translators, including: 1) use of fonts, color, shading, line-weight, grayscale, flashing, animation, and sound to display or otherwise communicate the source and translated text fragments, translation confidence and other metadata, alerts, etc.; 2) use of fonts, color, shading, line-weight, grayscale, flashing, animation, and sound to provide real time feedback, as a translation fragment is being entered by the translator, for example providing indicators for probable mistyping, misspelling, grammatical errors, etc, and for example indicating information about the probability of translation accuracy, which would enable translators to revise a low probability fragment on the fly before it is integrated and passed on by the Response Assembly Subsystem 50; 3) use of touch-sensitive screens; 4) use of speech synthesis and automatic voice recognition; and 5) use of instant messaging, text-messaging (SMS, etc.), e-mail, and other text-based communications methods.

The translation client interface program obtains results in whole or part by interacting with an automatic language translation software program. The translation client interface program passes on as much information as possible from the translation request (including the translation text fragment and metadata), and it passes back as much information as possible in the translation response (including the translated text fragment and metadata such as the confidence of translation accuracy for given words or phrases).

New translators may join the translation network after a registration procedure, wherein new translators participate in the translation network with a special "new translator" flag attached to their translation responses. The Response Assembly Subsystem 50 adjusts the reputation of new translators by comparing their performance to highly-reputable translators, but does not incorporate their translation responses into the output translation text.

Each translator has a reputation (or translation reputation) comprising one or more values or descriptors that together describe the expected quality of translations provided by that Translator.

The Request Distribution Subsystem 30 may make use of a translator's reputation (i.e., translation reputation) in choosing whether or not to send a given translation request to that translator. The Response Assembly Subsystem 50 may also make use of translator reputations in assembling summary information and preparing overall source text translations, for example by relying more heavily on translation responses from translators with good translation reputations. Then, the Response Assembly Subsystem 50 and Quality Control Subsystem 60 adjust translator reputations based on performance factors for that translator, including accuracy, speed, and availability. Human operators in the Quality Control Subsystem 60 can manually adjust translator reputations.

The Request Distribution Subsystem 30 and the Response Assembly Subsystem 50 can also issue reminders or alerts to the translator. Individual translators have a means of indicating their availability to the translation network, wherein individual translators may specify availability according to: 1) a fixed schedule; 2) priority of desired translation request categories; and 3) indicators specifying that the translator is currently available for translations, currently busy performing a translation, not available, etc.

Individual translators may be one or a combination of humans and computing machines—a single computer or network of computers running automatic language translation software.

Individual translators may be volunteers who are not compensated for their time or effort. Alternatively, individual translators may receive payments or other compensation for their time or effort. Translators may be paid a fixed salary, may be paid an hourly or daily rate, or may be paid piecemeal per translation via micropayments, wherein payments or compensation may be made immediately by direct credits or deposits to an account specified by the translator. In one instance, payments or compensation accrue as a balance owed to the translator, and are paid to the translator by means of a separate mechanism. Also, payments or compensation may be adjusted based on translator reputation and performance, where performance may include measures of translation accuracy, translation turn-around or processing times (responsiveness), etc.

4. Response Assembly Subsystem

A Response Assembly Subsystem 50 that collects translation responses, uses systematic and statistical methods to generate one or more translations to the target language of the original complete source text, and returns the resulting translations along with summary information and other metadata to the original source of the translation request.

Individual translation responses as well as translations assembled by the Response Assembly Subsystem 50 are adjusted for correctness and comprehension based on likely dialectical suites and the association of predicting words, phrases, and other conversational fragments. The Response Assembly Subsystem 50 combines the resulting multiple translation responses by taking into account translator reputations, as well as metadata in the translation responses that provides information about estimated translation accuracy in each translation response.

The translation responses include one-or-more suggested translations of the source text fragment into the target language, along with metadata ((expressed graphically or via sound as described above, and with links, pointers, identification codes that allow retrieval of metadata) that includes information such as: 1) overall confidence levels of the translation; 2) confidence levels for particular words, phrases, sentences; 3) unique translator identification code, which may be an anonymous identifier; 4) the original translation request; 5) suggested corrections to previous translations; and 6) grades, scores, or other indicators of the accuracy of previous translations.

In one instance, the Response Assembly Subsystem 50 makes use of statistical language models, language parsers, and other available tools from computational linguistics in assembling overall speech or text translations from the set of relevant translation responses. The Response Assembly Subsystem 50 may also make use of the Request Distribution Subsystem 30 to send out additional translation requests in order to improve the overall translation, e.g., in cases where the available translation responses are insufficient for assembling a reliable overall translation.

The Response Assembly Subsystem 50 provides translators with copies of any corrections to their translations, as well as other types of feedback on their performance.

The Response Assembly Subsystem 50 maintains "trackback" information from assembled overall translations to their contributing translation responses. The Response Assembly Subsystem 50 augments suggested overall translations with metadata that provides information about the number of contributing translators, the number of contributing translation responses, and confidence of the overall translations.

The Response Assembly Subsystem 50 can "pushback" assembled translations to the Distributed Translation Network 40, so that human and machine translators can adjust their subsequent translations accordingly, thereby "learning" from the aggregate output of the Distributed Translation Network 40. Likewise, the Dialog Manager 20 and/or the Response Assembly Subsystem 50 use statistical methods operating on the history of translation responses to adjust automatically subsequent translation responses from various translators, including both the translated speech or text, the stated probabilities or likelihood of correctness, etc., thereby "learning" from the aggregate output of the Distributed Translation Network 40.

5. Quality Control Subsystem

A Quality Control Subsystem 60 that evaluates and verifies selected translation responses for accuracy, verifies selected overall source speech or text translations, and maintains data on the translation quality provided by individual translators.

The Quality Control Subsystem 60 creates a special database of high-quality translation pairs. The Quality Control Subsystem 60, using automatic or manual methods, turns off a "new translator" flag when that translator is judged to be sufficiently reliable to contribute to the output translations.

The Quality Control Subsystem 60 selects a subset of the received translation responses for verification by systematic algorithms based on translation priorities, translator reputations, translation confidence indicators, operator choice, etc.

The Quality Control Subsystem 60 uses a special group of highly-qualified human translators to verify selected translation responses, and it uses facilities of the HDNLT itself in order to distribute, collect, and analyze translations as part of the verification process.

Additionally, the Quality Control Subsystem 60 may perform quality control verification on translation responses that themselves are the result of quality control verification ("second-level quality control"). The results from the Quality Control Subsystem 60 are used by the Response Assembly Subsystem 50 to update and correct previous translations. In addition to reducing the translation reputations of poorly-performing translators, the Quality Control Subsystem 60 flags certain poorly-performing translators for manual evaluation by human operators.

6. Database Generation Subsystem

A Database Generation Subsystem 70 that creates collections of translation pairs (source language speech or text and correct target language translation) in a form that may be useful for linguistics research generally, and for training human or machine translators in particular. The Database Generation Subsystem 70 cleans the source material and metadata in order to protect privacy and anonymity.

Additionally, the Database Generation Subsystem 70 collects and provides access to information such as: 1) original speech or text fragments and translations provided by translation responses, including metadata; 2) original speech or text fragments and their final translations, including metadata; 3) full original speech or text and output translations; 4) geographic origination of original speech or text; 5) geographic locations of contributing translators; and 6) translations of ongoing and completed dialogs managed by the Dialog Manager 20. The geographic location information is obtained by GPS, or similar devices, IP address, or manual user indicated location. Because dialectical suites tend to cluster geographically, and because the HDNLT system will geo-tag all source content in the database, dialectical domain decisions can be inferred from geo-location of either the user location or the content source.

Figure 4:
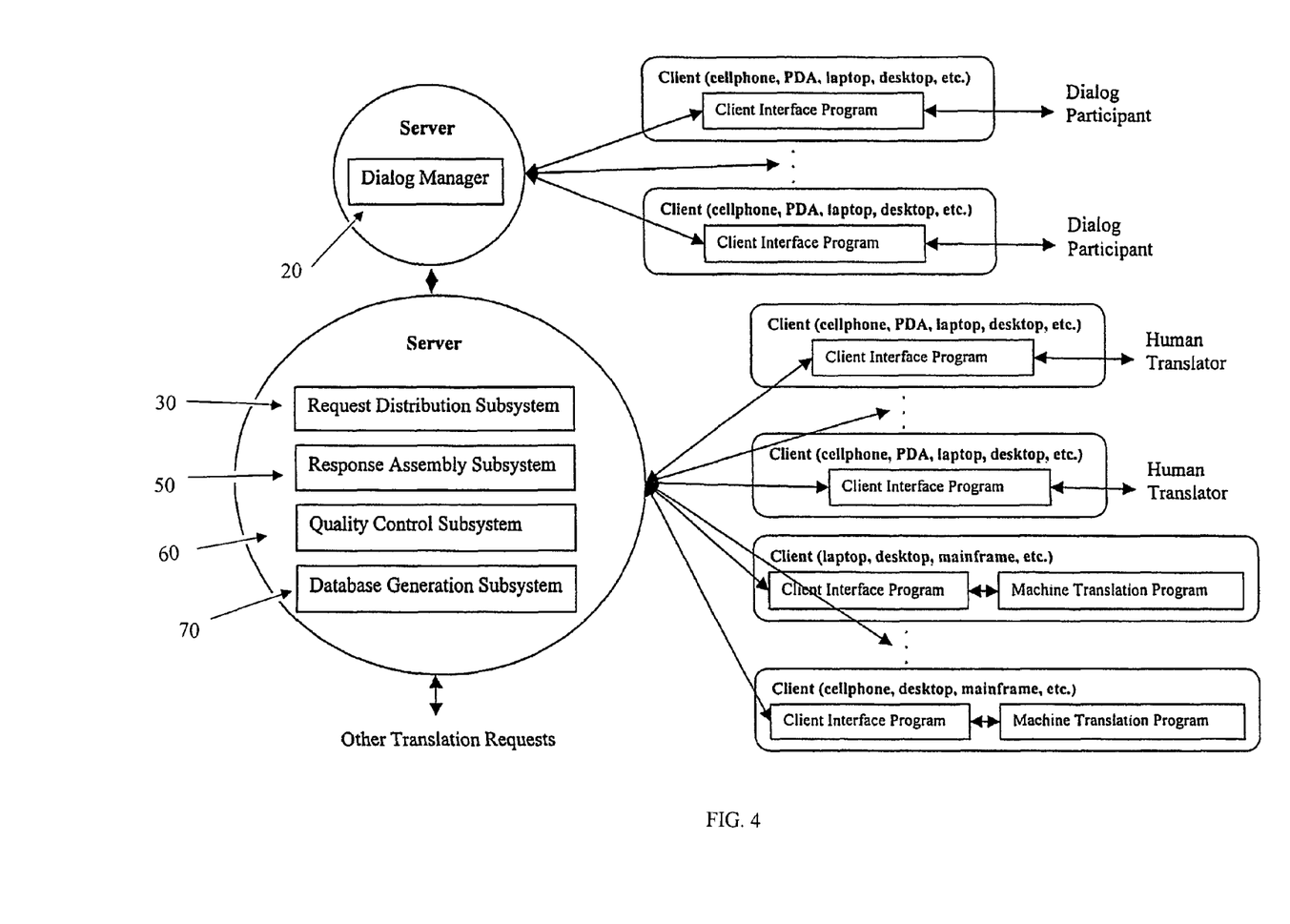
FIG. 4 shows a schematic diagram of a client server implementation of a Hybrid Distributed Network Language Translation (HDNLT) system in accordance with another embodiment.

In accordance with one example of a client server implementation of the HDNLT is shown in FIG. 4. In this example, two central servers are used—the first hosting the Dialog Manager 20, and the other hosting the Request Distribution Subsystem 30, the Response Assembly Subsystem 50, the Quality Control Subsystem 60, and the Database Generation Subsystem 70. The dialog participants interact with the Dialog Manager 20 via client interface programs that run on cell-phone, PDA, laptop, and desktop clients. The individual translators interact with the HDNLT subsystems via client interface programs that likewise run on external clients—in the case of human translators, the client interface programs interact with humans; in the case of machine translators, the client interface programs interact with machine translation programs.

Figure 5:
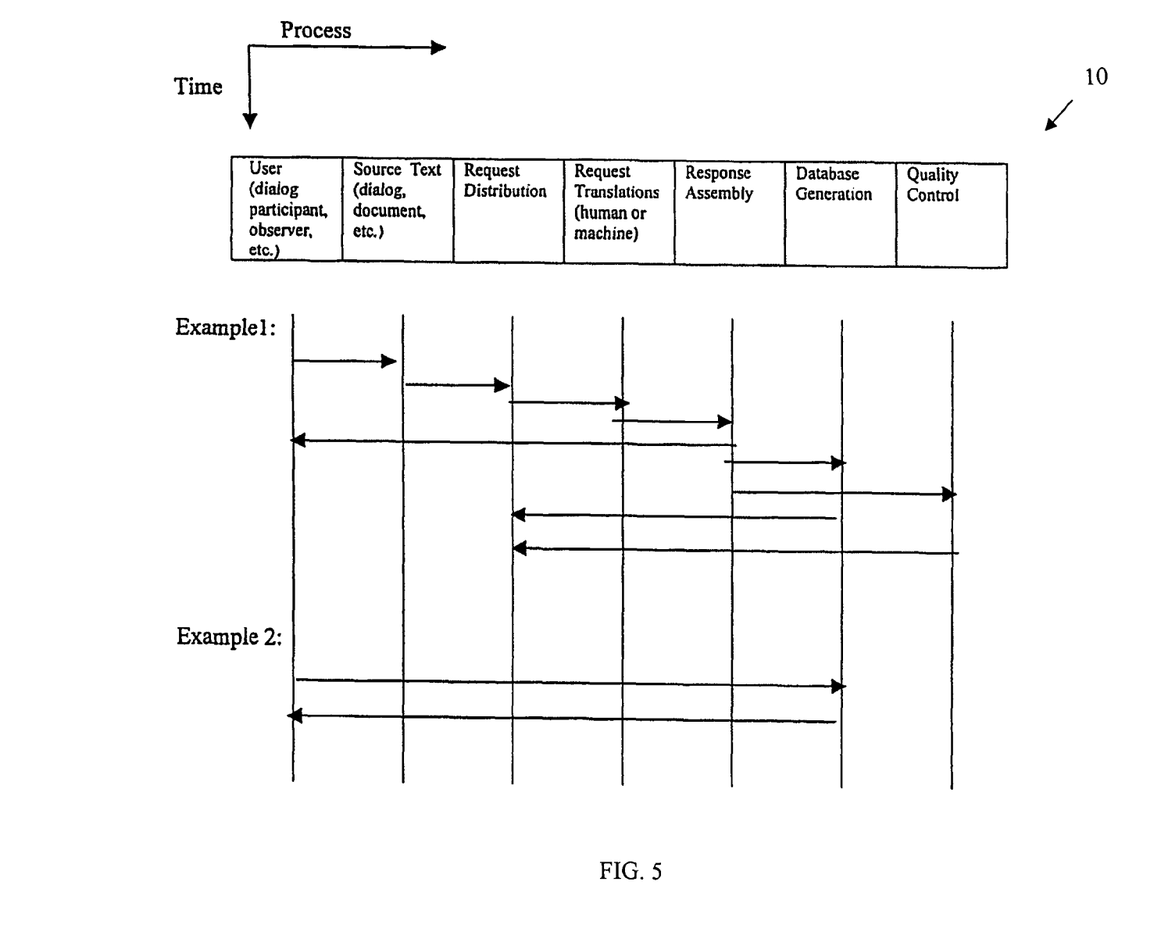
FIG. 5 shows a schematic diagram of a process timeline for a Hybrid Distributed Network Language Translation (HDNLT) system in accordance with further embodiment.

Some example process timelines are shown in FIG. 5, where time is shown vertically (the time direction is down in the diagram) and the particular process step is shown horizontally.

The above are exemplary modes of carrying out the invention and are not intended to be limiting. It will be apparent to those of ordinary skill in the art that modifications thereto can be made without departure from the spirit and scope of the invention as set forth in the following claims.

What is claimed is:

1. A computer-implemented language translation system comprising:
   a computer-implemented request distribution system, which receives requests to translate source speech or text from a source language to a target language, and wherein the request distribution system breaks the source speech or text into a plurality of text fragments and incorporates the fragments into a plurality of translation requests;
   a translation network comprised of multiple human and machine translators, wherein the human and machine translators are treated uniformly and generate translation responses containing one or more suggested translations of the text fragments into the target language, and wherein each of the translators has a translator reputation that describes an expected quality of translations provided by each of the human and machine translators; and
   a computer-implemented response assembly system, which collects the translation responses, which includes a plurality of translations for each and every text fragment and automatically assembles the suggested translations into an overall source speech or text translation based on the translator reputations of each translator, on statistical properties of the suggested translations individually and of an entire collection of translated text fragments, on statistical properties of the source and target languages, and on the context and details of the original translation request.

2. The system of claim 1, wherein the request distribution system sends the plurality of translation requests to at least one human translator and at least one machine translator for translation.

3. The system of claim 1, further comprising a computer-implemented quality control system, which comprises one or more human translators, and wherein the quality control system provides a plurality of quality control functions comprising:
   verifying selected translation responses for accuracy;
   verifying selected overall source text translations;
   adjusting translator reputations; and
   maintaining data on translator availability, translator speed, and translator accuracy.

4. The system of claim 1, further comprising a database generation system, which creates collections of translation pairs comprised of source language and correct target language translations, and wherein the database generation system includes:
   original speech or text fragments and translations provided by the translation responses;
   original speech or text fragments and their final translations;
   full original speech or text and output translations;
   geographic origination of original speech or text;
   geographic locations of contributing translators; and
   translator reputations.

5. The system of claim 1, wherein the request distribution system, without regard for whether the multiple human and machine translators are human or machine translators, uses the translator reputations of each of the human and machine translators in choosing whether or not to send a given translation request to a translator.

6. The system of claim 1, wherein the response assembly system, without regard for whether the multiple human and machine translators are human or machine translators, uses the translator reputations of each of the human and machine translators in preparing the overall source speech or text translation.

7. The system of claim 1, wherein the response assembly system, without regard for whether the multiple human and machine translators are human or machine translators, adjusts the translator reputations based on the performance of each of the human and machine translators.

8. The system of claim 1, wherein the translation requests and the translation responses include source speech or text, the translations, and metadata information comprised of links and pointers, such that the translators and the response assembly system can retrieve the metadata information upon request.

9. The system of claim 8, wherein the metadata information comprises:
   information about the translation context, including preceding or succeeding words, phrases, or sentences, and a summary of overall text subject, style, and tone;
   previous suggested translations of the same text fragment received by the response assembly system, including their metadata information; and
   previous suggested translations of different text from the same source.

10. The system of claim 9, wherein the metadata information further comprises:
    a secure, anonymous identifier of the source text originator;
    a geographic origination of the source text;
    an identifier indicating desired speed of translation;
    an identifier indicating the importance of an accurate translation;
    any relevant translation deadline;
    an identifier indicating desired translation style or domain including dialect and colloquial;
    an indication of whether the translation fragment is original text or a result of a translation;
    an information location identifier for the translation text fragment in the original text;
    retrieval instructions including links and pointers for previous translations of previous source text from the same source;
    overall confidence levels of the translation;
    confidence levels for particular words, phrases, and sentences;
    unique translator identification codes;
    the original translation request;
    suggested corrections to previous translations; and
    grades and/or scores of the accuracy of previous translations.

11. The system of claim 1, wherein a choice of how many and which of the machine and human translators to send a given translation request is made by a selection algorithm that balances a resulting total translation workload against a need to obtain a sufficiently-reliable translation within stated time constraints, and wherein the selection algorithm makes use of information about geographic locations, availabilities, and the translator reputations of each of the machine and human translators.

12. The system of claim 1, wherein the at least one human translator of the translation network has a means of indicating their availability to the translation network based on:
    a fixed schedule;
    a priority of desired translation request categories; and
    a real-time indicator specifying that the translator is currently available for translations, currently busy performing a translation, or not available.

13. The system of claim 1, wherein each of the human and machine translators in the translation network communicate with the language translation system using a translation client interface program, wherein the translation client interface program is implemented differently for some of the translators but that adheres to a standard interface or protocol for communication and information exchange that does not distinguish between a human or a machine.

14. The system of claim 13, where the translation client interface program uses a variety of user-interface methods to maximize information exchange with human translators, including:
- use of fonts, color, shading, line-weight, grayscale, flashing, animation, and sound to display or otherwise communicate a translation status and/or other metadata of the source text and the translation confidence and/or other metadata of translated text fragments and alerts;
- use of fonts, color, shading, line-weight, grayscale, flashing, animation, and sound to provide real time feedback, as a translation fragment is entered by the translator;
- use of touch-sensitive screens;
- use of speech synthesis and automatic voice recognition; and
- use of instant messaging, text-messaging (SMS, etc.), and/or e-mail.

15. The system of claim 1, further comprising a dialog manager, wherein the dialog manager manages an ongoing dialog between a plurality of dialog participants who require language translation services, wherein the dialog manager obtains the needed translations by communicating with the request distribution and response assembly systems, and wherein the dialog manager presents translation output to dialog participants using any available user-interface, including the use of fonts, color, shading, grayscale, animation, and sound to display or otherwise communicate the source and translated text fragments, translation confidence levels, other metadata, and/or alerts.

16. The system of claim 15, wherein the dialog participants can return translation responses to the dialog manager and the translation system, thereby rejecting the translation for reasons indicated in an accompanying metadata.

17. The system of claim 16, further comprising a metadata, a tagging, or a "microblog" mechanism to elaborate on the return, and whereby a dialog participant offers advice to translators regarding misspellings, awkward phrasing, incorrect slang, and/or suggested slang.

18. The system of claim 15, wherein the dialog manager, translation request system, response assembly system, and the database generation system include abilities to identify, predict, and make use of a dialectical suite comprising a collection of colloquialisms, phrasings, or communication conventions that cluster, and wherein individual translation responses as well as translations assembled by the response assembly system are adjusted for correctness and comprehension based on the dialectical suite and an association of predicting words, phrases, and other conversational fragments.

19. The system of claim 1, further comprising a new translator in the translation network, which has a new translator flag attached to a new translator response, and wherein the response assembly system adjusts the reputation of the new translator by comparing the new translator performance to a highly-reputable translator, but does not incorporate the translator responses into the output translation text, and wherein the quality control system, using automatic or manual methods, turns off the new translator flag when the new translator is judged to be sufficiently reliable to contribute to the output translations.

20. The system of claim 1, wherein the language translation system is adapted to return assembled translations to the translator network, wherein the translators adjust subsequent translations accordingly from an aggregate output of the translator network.

21. The system of claim 1, wherein the response assembly system maintains a database of information from assembled overall translations to their contributing translation response and augment suggested overall translations with metadata that provides information about:
- the number of contributing translators;
- the number of contributing translation responses; and
- a confidence indicator of the overall translations.

22. The system of claim 1, wherein the quality control system selects translation responses for verification based on a random sampling or by an algorithm based on translation priorities, translator reputations, translation confidence indicators, and/or operator choice.

23. The system of claim 1, wherein the response assembly system uses a statistical method operating on the history of translation responses to adjust automatically subsequent translation responses from various translators, including the translated text, the stated probabilities or likelihoods of correctness, such that the response assembly system learns from an aggregate output of the translation network.

24. The system of claim 1, wherein the response assembly system uses statistical language models and/or language parsers from computational linguistics in assembling overall text translations from a set of relevant translation responses.

25. The system of claim 1, wherein the response assembly system uses the request distribution system to send out additional translation requests in order to improve the overall translation where the available translation responses are insufficient for assembling a reliable overall translation.

26. The system of claim 1, wherein the request distribution system, response assembly system, and the one or more translators interact by means of a commonly editable (wiki) interface.

27. The system of claim 1, wherein the system is implemented on one or more of the following systems:
- a client-server architecture comprised of a plurality of central servers that communicate with a network of client translators and translator requestors;
- a peer-to-peer architecture comprised of a peer-to-peer network without any central servers or information repositories; or
- a combination of the client-server and the peer-to-peer network architectures.

28. The system of claim 1, wherein the text fragments are partially redundant and overlapping.

29. A computer-implemented language translation system comprising:
- a computer-implemented request distribution system, which receives requests to translate a text from a first language to a second language, and wherein the request distribution system breaks the text into a translation request comprised of a plurality of redundant and overlapping text fragments;
- a translation network comprised of multiple human and machine translators, which are treated uniformly, and wherein each of the multiple human and machine translators has a translator reputation that describes an expected quality of translations provided by each of the human and machine translators, and wherein the human and machine translators generate a translation containing a plurality of suggested translations of each of the text fragments into the second language; and a computer-implemented response assembly system, which collects the suggested translations and automatically assembles the suggested translations in the second language based on the translator reputations of each translator and statistical properties of the first and second languages.

30. A computer-implemented system of translating a source language to a target language comprising:
  a computer, which performs the following:
    receiving a request to translate speech or text from a source language to a target language;
    breaking the speech or text into translation requests comprised of a plurality of redundant and overlapping source text fragments;
    forwarding the plurality of source text fragments to multiple human and machine translators for translation of the plurality of source text fragments from the source language to the target language; and
    collecting translation responses containing one or more suggested translations of the source text fragment into the target language from the multiple human and machine translators and automatically generating overall source speech or text translations based on the translator reputations of each translator, on the statistical properties of the suggested translation, on the statistical properties of the source and target language, and on the context and details of the original translation request; and
  a translation network comprised of the human and machine translators, wherein the human and machine translators are treated uniformly and generate the translation responses containing one or more suggested translations of the text fragments into the target language, and wherein each of the translators has a translator reputation that describes an expected quality of translations provided by each of the human and machine translators.

* * * * *